April 1, 1924.

J. K. WICK 1,488,629

TRACTOR TRUCK

Filed Dec. 20, 1921

J. K. WICK

TRACTOR TRUCK

Filed Dec. 20, 1921  3 Sheets-Sheet 2

Inventor
John K. Wick.
By Harry C. Schroeder
Attorney

April 1, 1924.

J. K. WICK

TRACTOR TRUCK

Filed Dec. 20, 1921

Inventor
John K. Wick.

By Harry C Schroeder
Attorney

Patented Apr. 1, 1924.

1,488,629

UNITED STATES PATENT OFFICE.

JOHN K. WICK, OF OAKLAND, CALIFORNIA.

TRACTOR TRUCK.

Application filed December 20, 1921. Serial No. 523,632.

*To all whom it may concern:*

Be it known that I, JOHN K. WICK, a citizen of the United States, residing at Oakland, in the county of Alameda and State of California, have invented certain new and useful Improvements in Tractor Trucks, of which the following is a specification.

My invention is an improved tractor truck, which is strong, durable and highly efficient, and may be manufactured at a reasonably low cost.

Referring to the annexed drawings in which my invention is illustrated and which form a part of this specification:

Figure 1:
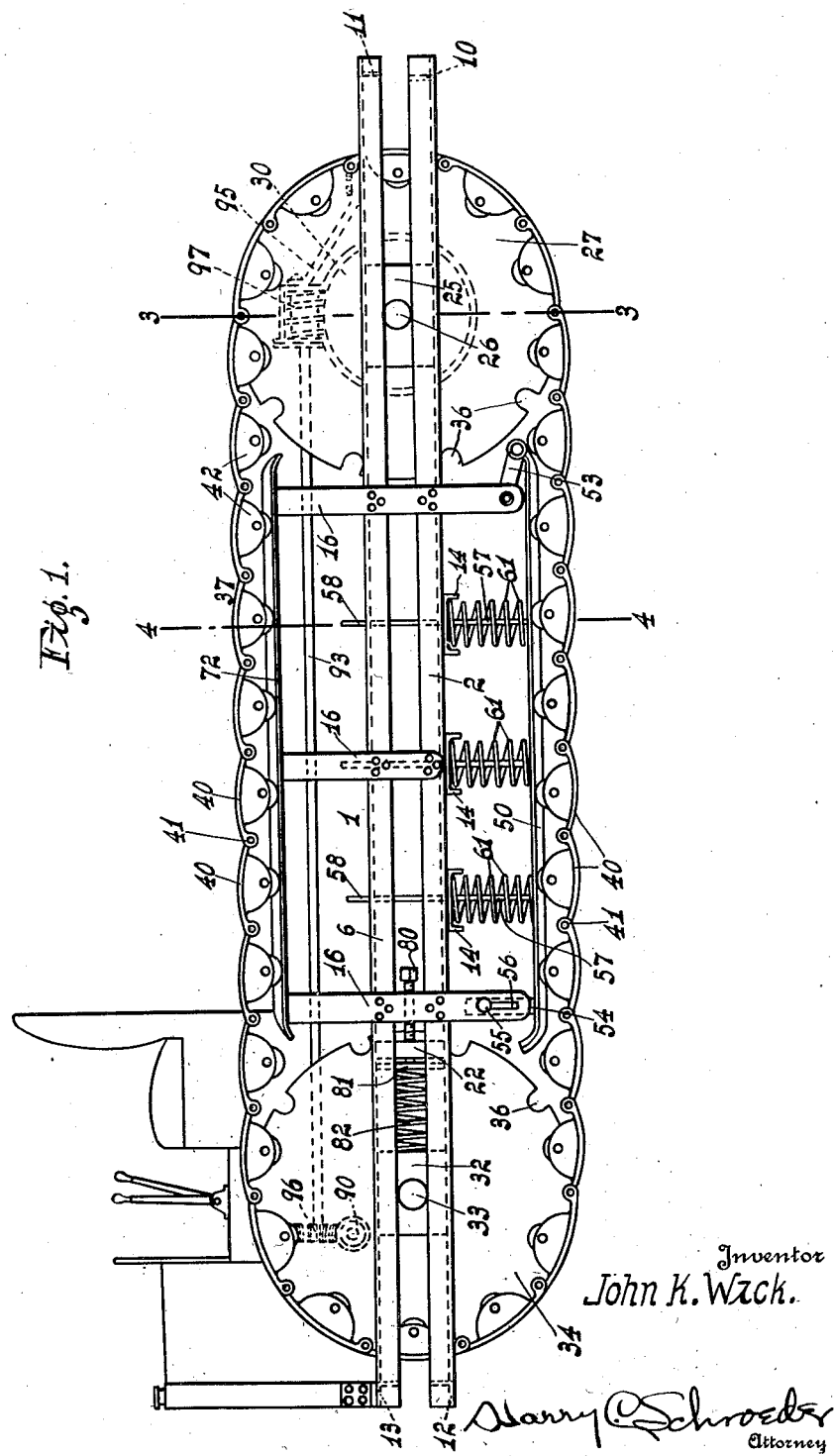
Figure 1 is a side elevation of my tractor truck.
Figure 2:
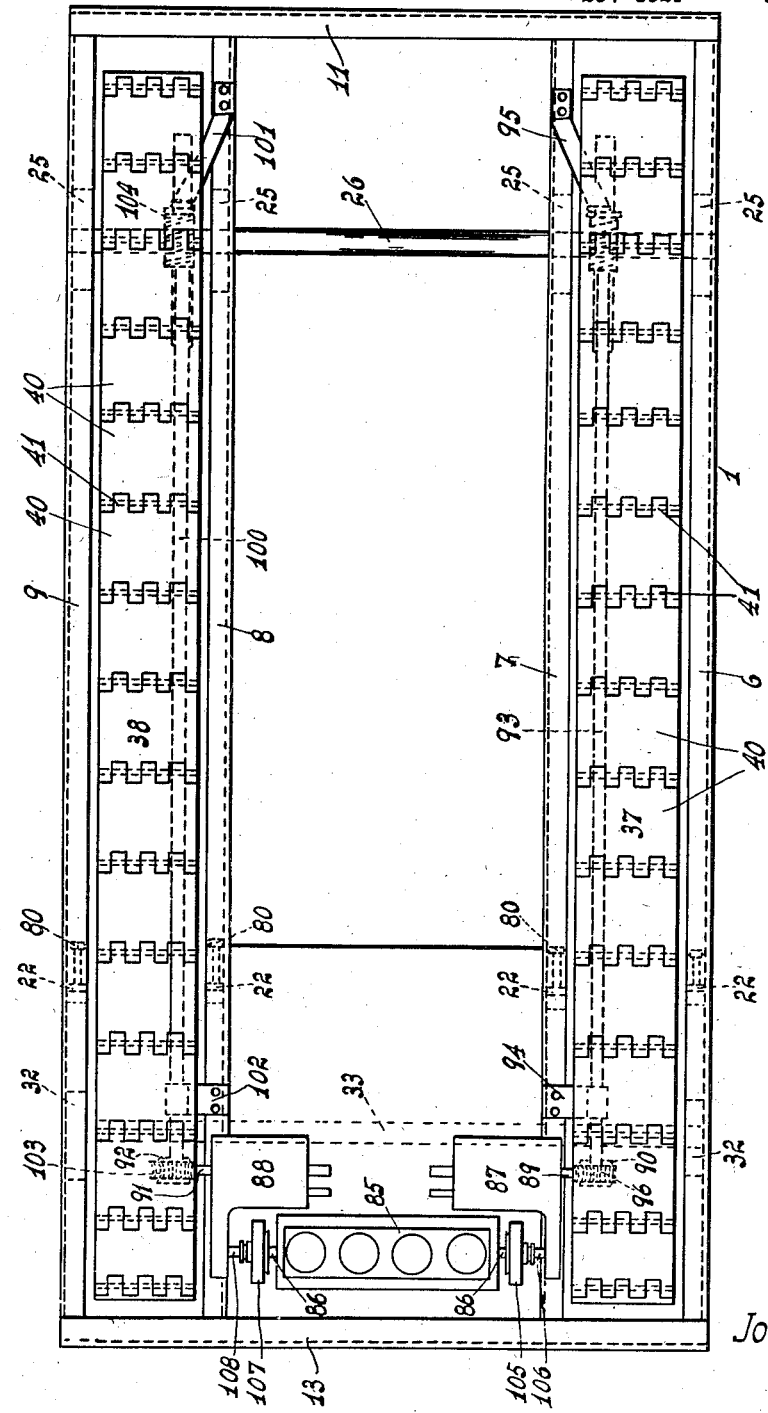
Figure 2 is a plan view of my tractor truck.
Figure 3:
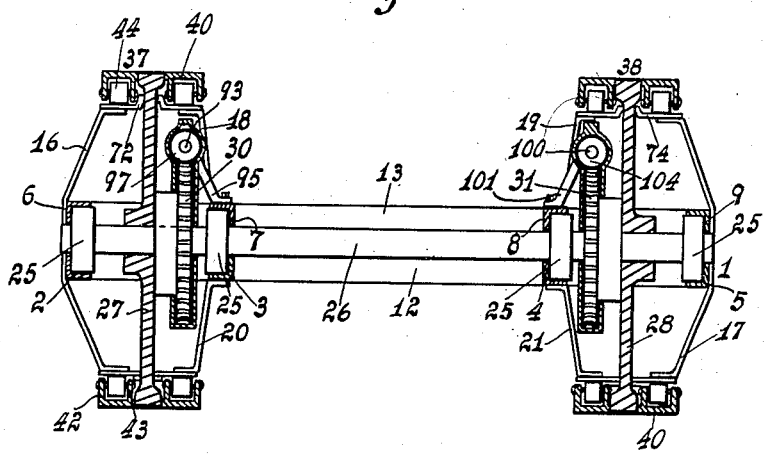
Figure 3 is a transverse section of my truck taken on line 3—3 of Figure 1.
Figure 4:
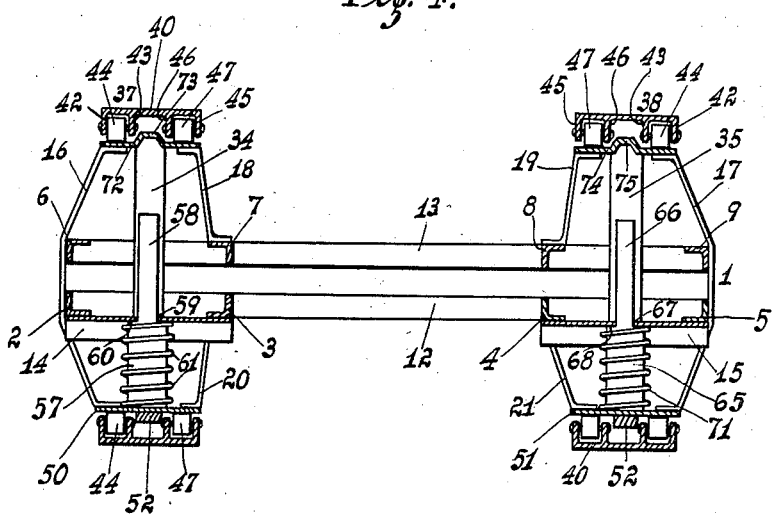
Figure 4 is a transverse section of my truck taken on line 4—4 of Figure 1.

In the drawings 1 indicates the frame of my tractor truck which comprises longitudinal angle bars 2, 3, 4 and 5; longitudinal angle bars 6, 7, 8 and 9 arranged respectively above the bars 2, 3, 4 and 5; transverse angle bar 10 which connects the rear ends of the bars 2, 3, 4 and 5; transverse angle bar 11 which connects the rear ends of bars 6, 7, 8 and 9; angle bar 12 which connects the forward ends of bars 2, 3, 4 and 5; angle bar 13 which connects the forward ends of bars 6, 7, 8 and 9; three U-shaped bars 14 which are secured to the under side of the bars 2 and 3; three U-shaped bars 15 which are secured to the under side of the bars 4 and 5; three vertical bars 16 which are connected to the outside of angle bars 2 and 6; three vertical bars 17 which are connected to the outside of the bars 5 and 9; supports 18 and 19 upstanding from the bars 7 and 8 respectively; supports 20 and 21 depending from the bars 3 and 4 respectively; and screw blocks 22 arranged between bars 2 and 6, 3 and 7, 4 and 8 and 5 and 9 respectively. Block bearings 25 are secured in the angle bars 2 and 6, the angle bars 3 and 7, the angle bars 4 and 8, and the angle bars 5 and 9 respectively near the rear end of said bars, in which bearings is secured the rear axle 26. On said rear axle are journaled two rear sprockets 27 and 28 between the longitudinal frame bars 2 and 6 and bars 3 and 7, and between the bars 4 and 8 and bars 5 and 9 respectively. A worm gear 30 is journaled on the axle 26 and secured to the inside of sprocket 27 between said sprocket and the bars 3 and 7. A worm 31 is journaled on the axle 26 and secured to the inside of the sprocket 28 between said sprocket and the bars 4 and 8. Block bearings 32 are slidably mounted in the forward portion of longitudinal bars 2 and 6, bars 3 and 7, bars 4 and 8, and bars 5 and 9 respectively in which bearings is secured the front axle 33. A front sprocket 34 is journaled on the front axle between the frame bars 2 and 6 and bars 3 and 7. A front sprocket 35 is journaled on the front axle 33 between the longitudinal frame bars 4 and 8 and bars 5 and 9. The sprockets 27, 28, 34 and 35 are disks and are provided with notches 36 in their peripheries. A traction chain 37 travels over the sprockets 27 and 34 and a traction chain 38 travels over the sprockets 28 and 35. The links 40 are arched to fit the periphery of the sprockets. The links 40 of said traction chains are hinged together by hinges 41 which enter the notches 36 as the chains are driven by said sprockets. Ears 42 extend inwardly from the outside of links 40 and ears 43 extend from said links a short distance inwardly from the ears 42, in which ears are journaled rollers 44. Ears 45 extend from the inside of the links 40 and ears 46 extend from said links a short distance from the ears 45 in which ears are journaled rollers 47. The rollers 44 and ears 43 of chain 37 travel past the outside of the sprockets 27 and 34, while the rollers 44 of chain 38 travel past the outside of sprockets 28 and 35. The rollers 47 and ears 45 of chain 38 travel past the inside of the sprockets 28 and 35 while the same rollers of chain 37 travel past the inside of sprockets 27 and 34. The rollers 44 and 47 of the lower reach of the chains 37 and 38 travel over tracks 50 and 51 respectively, there being a longitudinal flange 52 on the lower surface of each track, past the outside and inside of which travel the link ears 43 and 46 respectively, whereby the rollers are prevented from sliding sidewise off the tracks. Links 53 respectively connect the rear ends of said tracks to the lower ends of the bars 16 and 17 which are nearest the rear sprockets 28 and 29 respectively. Shanks 54 extend upwardly from the forward ends of the tracks 50 and 51 and carry pins 55 on their upper ends which project outwardly through vertical slots 56 in the foremost bars 16 and 17, the outer ends of said pins being headed to prevent them from withdrawing inwardly out of said slots. Shanks 57 three in number extend upwardly from the track 50, the upper portion 58 of which shanks being reduced and extending through openings 59 in the transverse bars 14, there being shoulders 60 formed on said shanks between the main and reduced portions thereof, which engage the bars 14 and limit the upward movement of the track 50 in such position that the lower reach of traction chain 37 extends straight with its rollers 44 and 47 engaging the track. Springs 61 surround the main portion of the shanks 57 and engage the track 50 and the bars 14 so as to force the track and chain 37 downwardly when the load on the truck is light, but to yield and allow the track and chain to move upwardly until the chain is straight when the load on the truck is heavy. Shanks 65, three in number, extend upwardly from the track 51, the upper portion 66 of said shanks being reduced and extending through openings 67 in the transverse bars 15, there being shoulders 68 formed on said shanks between the main and reduced portions thereof, which engage the bars 15 and limit the upward movement of the track 51 in such position that the lower reach of chain 38 extends straight with its rollers 44 and 47 engaging the track. Springs 71 surround the main portion of the shanks 65 and engage the track 51 and the bars 15 so as to force the track and chain 38 downwardly when the load on the track is light, but to yield and allow the track and chain to move upwardly until the chain is straight when the load is heavy. On the top of the bars 16 and the supports 18 is secured a rigid track 72 over which the rollers 44 and 47 of the upper reach of chain 37 travels, said track being formed with an upstanding longitudinal ridge 73, outside and inside of which travel said rollers respectively, whereby the chain is prevented from shifting sidewise off the track. On the top of bars 17 and supports 19 is secured a rigid track 74 over which travel the rollers 44 and 47 of the upper reach of the chain 38, said track being formed with an upstanding longitudinal ridge 75 outside and inside of which respectively travel said rollers, whereby the chain is prevented from shifting sidewise off the track.

A set screw 80 extends forwardly through each block 22 and on the forward end of each screw is secured a plate 81. Between each plate 81 and its companion bearing block 32 is interposed a spring 82 which urges the bearings, shaft 33 and sprockets 34 and 35 forwardly to take up the slack in the chains 37 and 38.

On the forward end of the truck frame 1 is mounted an engine 85, the shaft 86 of which drives two transmission gearings 87 and 88 at the left and right of the truck respectively. On the shaft 89 of gearing 87 is secured a worm 90. On the shaft 91 of gearing 88 is secured a worm 92. A shaft 93 extending longitudinally under the track 72 and the upper reach of chain 37, is journaled at its forward end in a bracket 94 secured on the frame bar 7, and at its forward end in bracket 95 also secured on said bar. On the rear end of shaft 93 is secured a worm gear 96 which meshes with the worm 90. On the rear end of shaft 93 is secured a worm 97 which meshes with the worm gear 30. A shaft 100 extending longitudinally under the track 74 and the upper reach of chain 38, is journaled at its rear end in a bracket 101 secured on the frame bar 8, and at its forward end in a bracket 102 also secured on said bar. On the forward end of shaft 100 is secured a worm gear 103 which meshes with worm 92. On the rear end of said shaft is secured a worm 104 which meshes with worm gear 31. The engine shaft 86 drives the gearing 87 through a clutch 105 and gearing shaft 106. The engine shaft 86 drives the gearing 88 through a clutch 107 and gearing shaft 108.

Both clutches 105 and 107 are thrown into operation to drive both chains 37 and 38 and the truck straight ahead. To cause the truck to turn to the right only the clutch 107 is thrown into operation to drive the chain 38. To turn to the left only the clutch 105 is thrown into operation to drive chain 37.

Having described my invention, I claim:

1. In a tractor truck, a frame, front and rear sprockets on said frame, a chain traveling over the front and rear sprocket at each side of the frame, rollers on the links of said chains, cross bars on said frame provided with apertures, tracks between said front and rear sprockets, over which the rollers on the lower reaches of the chains pass, shanks on said tracks, the upper portion of said shanks being reduced and extending through the apertures in said cross bars, shoulders between the main and reduced portion of said shanks for engaging said cross bars and limiting the upward movement of said track in such position that the lower reaches of the chains will extend straight with its rollers engaging the tracks, and springs surrounding said shanks between said tracks and said cross bars for urging said tracks downwardly against the chains.

2. In a tractor truck, a frame, front and rear sprockets on said frame, a chain traveling over the front and rear sprocket at each side of the frame, rollers on the links of said chains, cross bars on said frame provided with apertures, tracks between said front and rear sprockets, over which the rollers on the lower reaches of the chains pass, shanks on said tracks, the upper portion of said shanks being reduced and extending through the apertures in said cross bars, shoulders between the main and reduced portion of said shanks for engaging said cross bars and limiting the upward movement of said track in such position that the lower reaches of the chains will extend straight with its rollers engaging the tracks, springs surrounding said shanks between said tracks and said cross bars for urging said tracks downwardly against the chains, a link connecting the rear end of each track to the frame, a shank upstanding from the forward end of each track, and a pin on each shank extending through a vertical slot in said frame.

In testimony whereof I affix my signature.

JOHN K. WICK.